(12) United States Patent
Iizuka

(10) Patent No.: US 6,219,169 B1
(45) Date of Patent: Apr. 17, 2001

(54) BEAM SHAPE COMPENSATION OPTICAL SYSTEM

(75) Inventor: Takashi Iizuka, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/478,375

(22) Filed: Jan. 6, 2000

(30) Foreign Application Priority Data

Jan. 7, 1999 (JP) .................................................. 11-001579

(51) Int. Cl.[7] ............................. G02B 26/02; G02B 26/00; G02B 5/04
(52) U.S. Cl. ............................. 359/234; 359/290; 359/837
(58) Field of Search .................................. 359/206, 210, 359/234, 290, 831, 837, 668, 669, 670

(56) References Cited

U.S. PATENT DOCUMENTS

| 5,303,221 | 4/1994 | Maeda et al. ........................ 369/112 |
| 5,632,083 | * 5/2000 | Tada et al. ....................... 219/121.68 |
| 6,064,504 | * 5/2000 | Minakuchi et al. ................. 359/201 |

FOREIGN PATENT DOCUMENTS

| 747893 | 12/1996 | (EP) . |
| 828244 | 3/1998 | (EP) . |
| 851244 | 7/1998 | (EP) . |
| 881634 | 12/1998 | (EP) . |
| 63-125914 | 5/1988 | (JP) . |
| 9-288837 | 11/1997 | (JP) . |
| 9-306108 | 11/1997 | (JP) . |
| 11-16194 | 1/1999 | (JP) . |
| 00/00964 | 1/2000 | (WO) . |

OTHER PUBLICATIONS

"Dual Wavelength Optical Head for 0.6 mm and 1.2 mm Substrate Thicknesse", R. Katayama et al., Japanese Journal of Applied Physics., vol. 36, 1997, pp. 460–466, XP002133610, Tokyo, (ISSN: 0021–4922).
English Language Abstract of JP 9–288837.
English Language Abstract of JP 9–306108.
English Language Abstract of JP 11–16194.

* cited by examiner

Primary Examiner—Cassandra Spyrou
Assistant Examiner—Jared Treas
(74) Attorney, Agent, or Firm—Greenblum & Bernstein, P.L.C.

(57) ABSTRACT

A beam shape compensation optical system includes a first anamorphic beam expander which expands a cross section of a parallel beam incident along a predetermined direction at a first magnification ratio M1 at least in a first direction which is perpendicular to the predetermined direction, and a second anamorphic beam expander which expands a cross section of a parallel beam incident along the predetermined direction at a second magnification ratio M2 at least in a second direction which is perpendicular to the predetermined direction. The first and second anamorphic beam expander are rotatable so that an angle between the first direction and the second direction on a plane perpendicular to the predetermined direction is changeable.

13 Claims, 7 Drawing Sheets

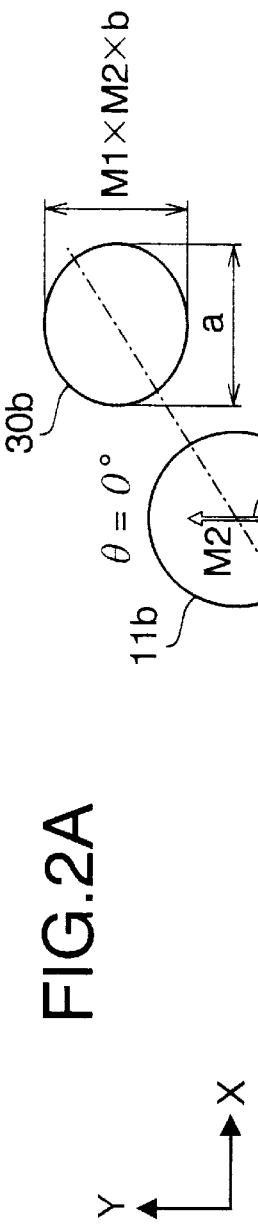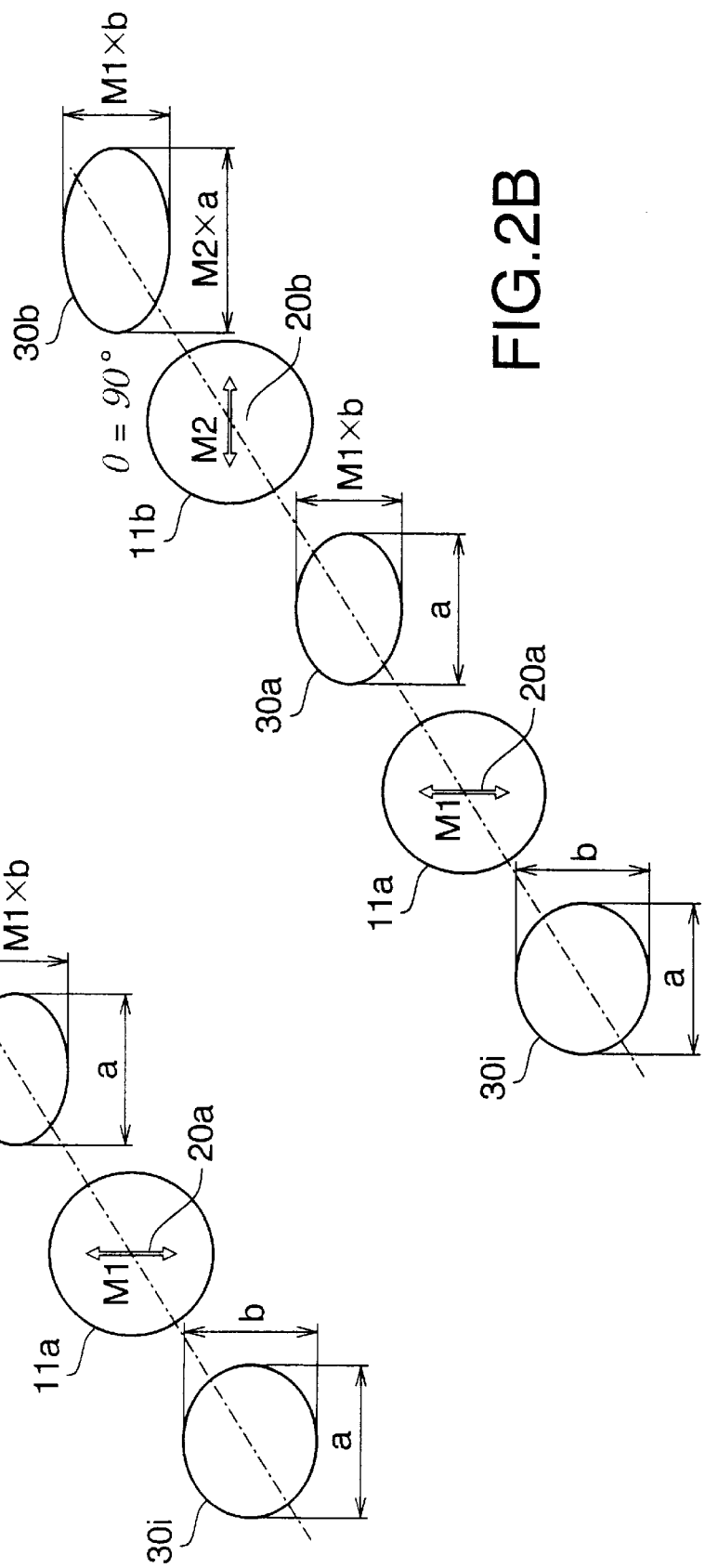

BEAM SHAPE COMPENSATION OPTICAL SYSTEM

BACKGROUND OF THE INVENTION

The present invention relates to a beam shape compensation optical system for compensating a cross-sectional shape of a beam, and an imaging device employing the beam shape compensation optical system.

Among devices utilizing light beams, some require a beam of which a cross sectional shape is compensated. For example, in an imaging device utilizing a scanning beam, it is preferable that a beam spot formed on a surface on which an image is formed has a circular shape. Therefore, the cross-sectional shape of a beam emitted by a light source such as an argon laser source is compensated to have a circular cross section.

Conventionally, such compensation is done at a designing and/or manufacturing stage. Optionally or alternatively, a compensation optical system such as a zoom expander including a plurality of cylindrical lenses or the like is adopted to compensate the shape (i.e., to compensate to have the circular cross section) of the beam.

In order to design and manufacture an optical system which is capable of compensating a laser beam as desired, the optical system should be designed for individual devices since the cross sectional shape of the laser beam emitted by the laser sources have individual differences. Further, even in a single device, if the laser source is replaced with another one, the compensation optical system should also be replaced according to the characteristic of the new laser source.

If the zoom expander is used, a relative inclination between the generating lines of the respective cylindrical lenses greatly affect wavefront aberration. Therefore, when the zoom expander is used, a troublesome adjustment of the zoom expander is required. Further, decentering of the cylindrical lenses when zooming is performed also causes a relatively large amount of aberration. Therefore, the compensation of the cross-sectional shape of the beam by the zoom expander is very difficult.

SUMMARY OF THE INVENTION

It is therefore an object of the invention to provide an improved beam shape compensation optical system capable of compensating a cross-sectional shape of various type of beams, relatively easily.

Another object of the invention is to provide an imaging device which allows a relatively simple adjustment operation for compensating the cross-sectional shape of the beam when the device is manufactured and/or when a light source is replaced.

For the above object, according to an aspect of the invention, there is provided a beam shape compensation optical system, which is provided with:

a first anamorphic beam expander which expands a cross section of a parallel beam incident along a predetermined direction at a first magnification ratio $M1$ at least in a first direction which is perpendicular to the predetermined direction; and a second anamorphic beam expander which expands a cross section of a parallel beam incident along the predetermined direction at a second magnification ratio $M2$ at least in a second direction which is perpendicular to the predetermined direction. The first and second anamorphic beam expander are arranged rotatable so that an angle between the first direction and the second direction on a plane perpendicular to the predetermined direction is changeable.

Since the cross-sectional shape of the incident beam can be changed in two different directions individually, and the directions are changeable, various types of elliptical shapes can be changed into a perfect circle easily.

According to another aspect of the invention, there is provided a beam shape compensation optical system, provided with:

a first beam expander which expands a cross section of a parallel beam incident along a first predetermined direction at a first magnification ratio $M1$ along a first magnification axis which is perpendicular to the predetermined direction;

a first holder for holding the first beam expander such that the first beam expander is rotatable about a first axis which is parallel to the first predetermined direction;

a second beam expander which expands a cross section of a parallel beam incident along a second predetermined direction at a second magnification ratio $M2$ along a second magnification axis which is perpendicular to the predetermined direction; and a second holder for holding the second beam expander such that the second beam expander is rotatable about a second axis which is parallel to the second predetermined direction.

Optionally, the second axis may be coaxial with the first axis. With this structure, the principal ray of the incident beam and the principal ray of the beam emitted from the beam shape compensation optical system is aligned on a same line.

Optionally, $M1 \times M2 = 1$. If this condition is satisfied, the area of the incident beam and the area of the compensated beam are unchanged.

Alternatively, $M1$ is equal to $M2$. In this case, it is not necessary to prepare beam expanders having different characteristics. In other words, only by one type of, and two beam expanders, the beam shape can be compensated.

In one example, each of the first and second beam expander includes two cylindrical lenses.

Alternatively, each of the first and second beam expander may include two prisms.

According to a further aspect of the invention, there is provided an imaging device, which is provided with: a laser source for emitting a parallel laser beam; and a beam shape compensation optical system inserted within an optical path of the laser beam for compensating a cross sectional shape of the laser beam.

The beam shape compensation optical system may include:

a first beam expander which expands a cross section of the laser beam incident along a first predetermined direction at a first magnification ratio $M1$ along a first magnification axis which is perpendicular to the first predetermined direction;

a first holder for holding the first beam expander such that the first beam expander is rotatable about a first axis which is parallel to the first predetermined direction;

a second beam expander which expands a cross section of the laser beam incident along a second predetermined direction at a second magnification ratio $M2$ along a second magnification axis which is perpendicular to the second predetermined direction; and a second holder for holding the second beam expander such that the second beam expander is rotatable about a second axis which is parallel to the second predetermined direction.

BRIEF DESCRIPTION OF THE ACCOMPANYING DRAWINGS

FIGS. 2A and 2B show functions of the beam shape compensation optical system according to the first embodiment;

Figure 7:
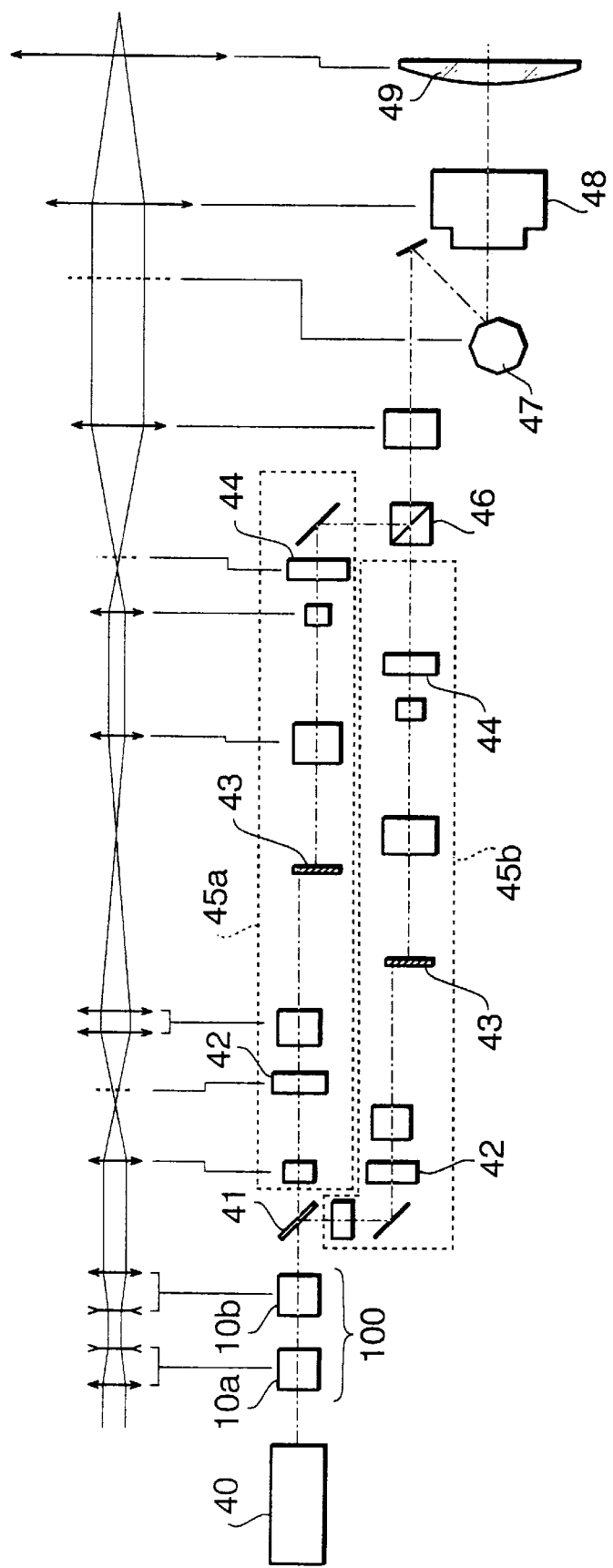
Figure 8:
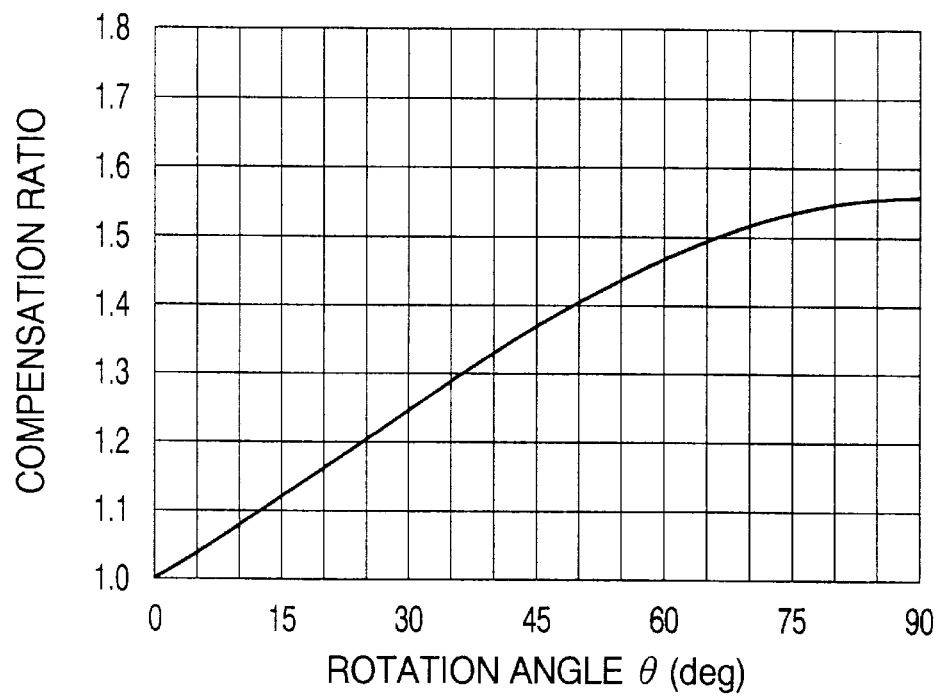
Figure 9:
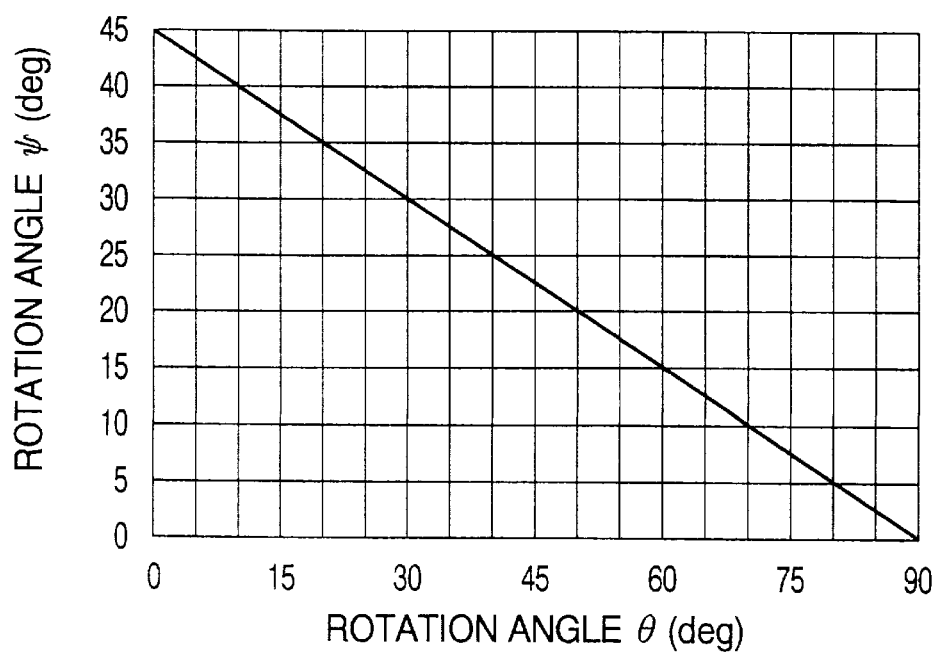
Figure 10:
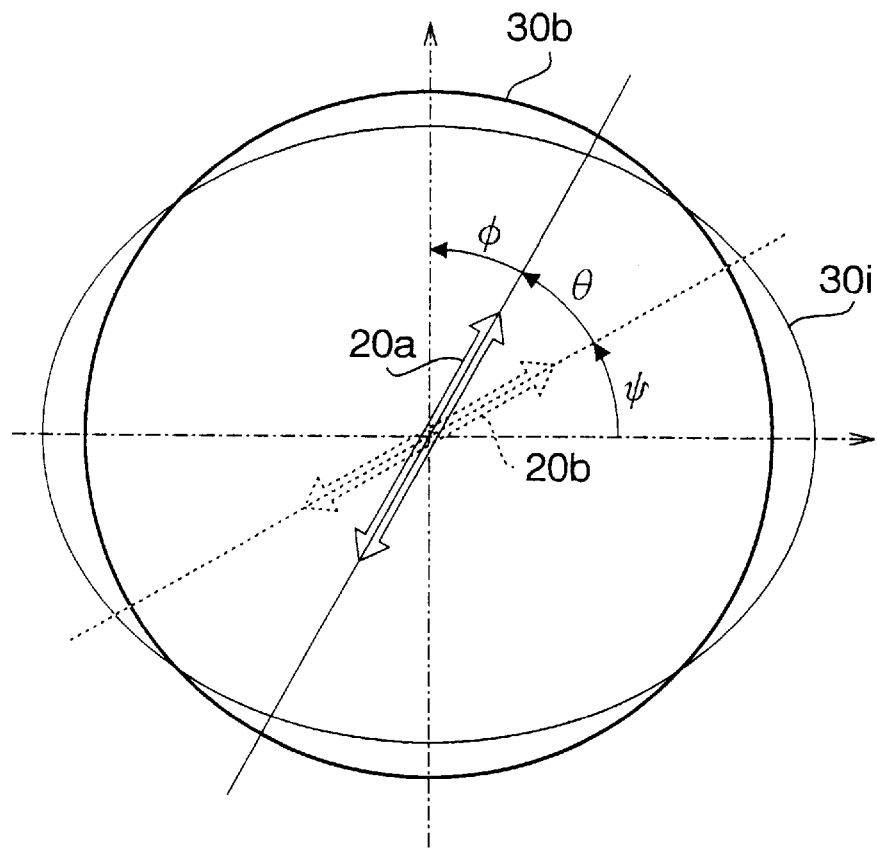
Figure 11:
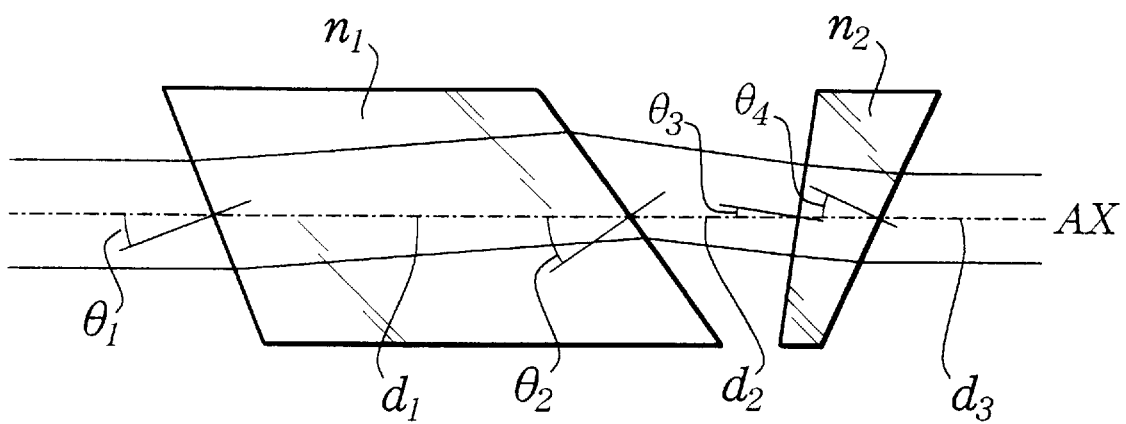

FIG. 7 schematically shows a structure of an imaging device employing the beam shape compensation optical system according to the first embodiment;

FIG. 8 is a graph illustrating a relationship between a compensation ratio and a rotation angle θ;

FIG. 9 is a graph illustrating a relationship between a rotation angles φ and θ;

FIG. 10 illustrates an adjustment operation of the beam shape using the beam shape compensation optical system according to the first embodiment; and FIG. 11 schematically shows an anamorphic beam expander according to the second embodiment.

DESCRIPTION OF THE EMBODIMENTS

Hereinafter, the invention will be described with reference to the accompanying drawings.

Figure 1A:
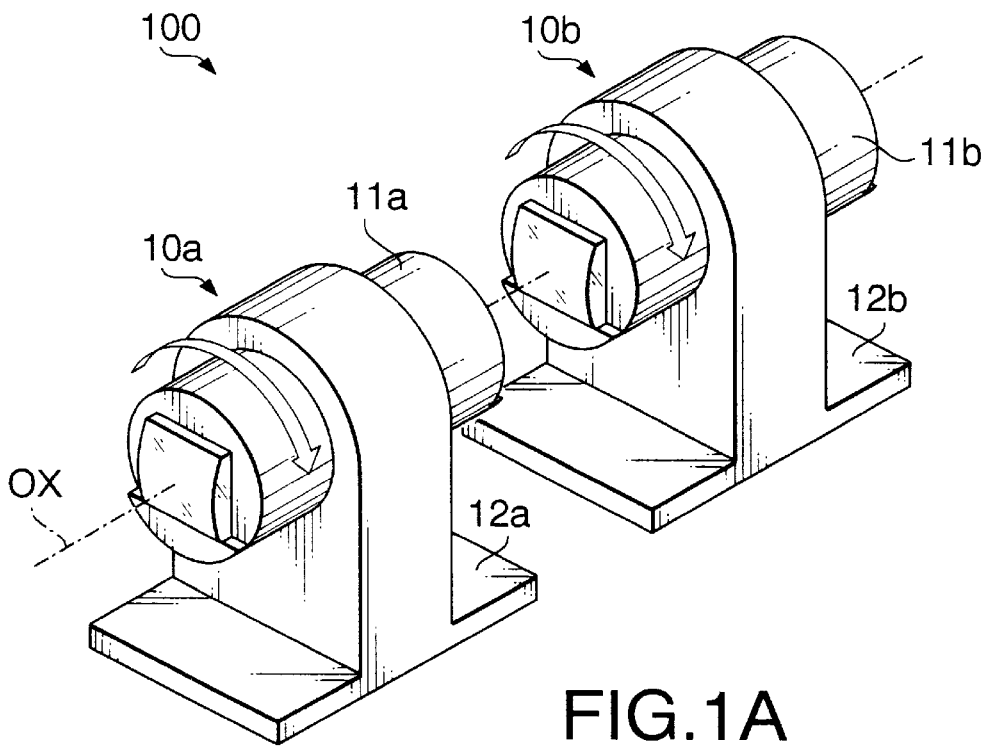
FIGS. 1A and 1B are perspective views schematically showing a structure of a beam shape compensation optical system according to a first embodiment of the invention.
Figure 1B:
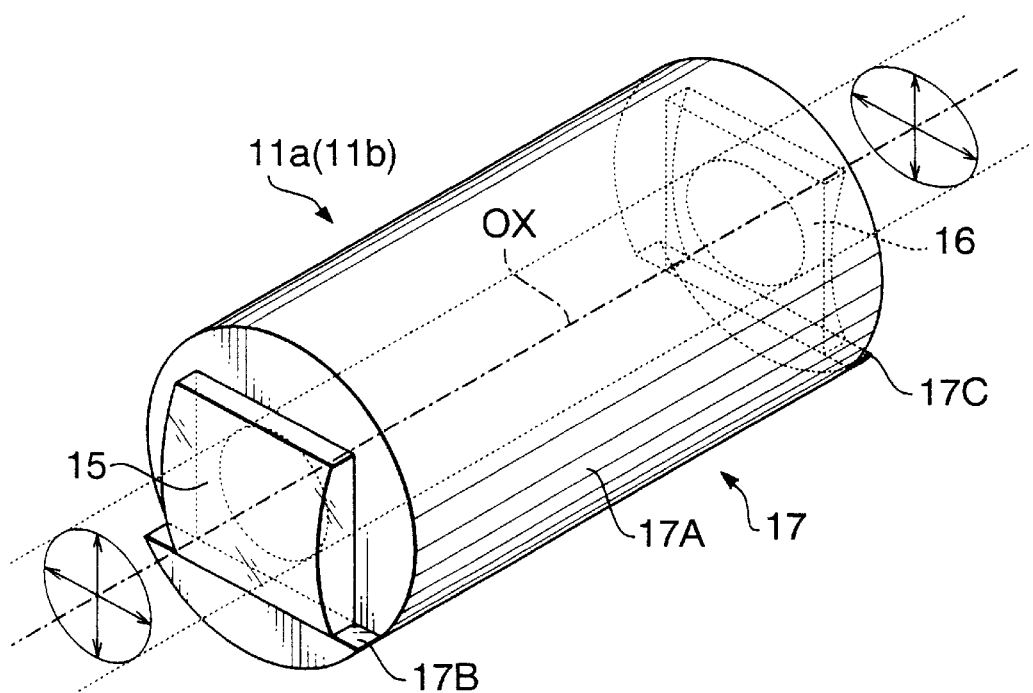

FIGS. 1A and 1B schematically show a structure of the beam shape compensation optical system 100 according to a first embodiment of the invention. As shown in FIG. 1A, the beam shape compensation optical system 100 is provided with:

a first compensation system 10a including a beam expander 11a and a holder 12a; and a second compensation system 10B including a beam expander 11b and a holder 12b.

Each of the beam expanders 11a and 11b is an anamorphic beam expander which magnifies a cross-section of a parallel beam only in a predetermined direction, which will be referred to as an axis of magnification. The magnification ratios of the beam expanders 11a and 11b are M1 ($\neq$1) and M2 ($\neq$1), respectively.

FIG. 1B shows one of the beam expanders 11a and 11b. It should be noted that the two beam expanders 11a and 11b are the same in construction, and accordingly, one of them, i.e., the beam expander 11a is explained.

As shown in FIG. 1B, the beam expander 11a has:

a plano-convex cylindrical lens 15;

a plano-concave cylindrical lens 16; and a lens barrel 17 holding the lenses 15 and 16.

The lens barrel 17 has:

a hollow cylindrical member 17A;

a holding member 17B for holding the lens 15 at one end surface of the cylindrical member 17A; and another holding member 17C for holding the lens 16 at the other end surface of the cylindrical member 17A.

The lenses 15 and 16 are fixed with respect to a central axis OX of the cylindrical member 17A at a predetermined angle. The generating lines of the cylindrical surfaces of the lenses 15 and 16 are parallel to each other. The lenses 15 and 16 are arranged such that the central axis OX of the cylindrical member 17A passes the center of the lenses 15 and 16. The axis OX is defined as the optical axis of the beam expander 11A. An axis is defined to extend in a direction in which the beam expander 11a has a power, and will be referred to as a first magnification axis.

The holder 12a holds the beam expander 11a such that the lens barrel 17 is rotatable about the central axis (or the optical axis) OX of the cylindrical member 17A.

As described above, the beam expander 11b has the same structure as the beam expander 11a, and thus, the holder 12b holds the beam expander 11b such that the lens barrel 17 is rotatable about the optical axis of the beam expander 11b. A second magnification axis is defined as an axis extending in a direction where the beam expander 11b has a power.

The beam shape compensation optical system 100 is constituted such that the optical axes of the beam expander 11A and the beam expander 11b coincide with each other.

With the above structure, the beam shape compensation optical system 100 is capable of magnifying a parallel beam, which is incident along a direction parallel to the optical axis OX, at a magnification of M1, along the first magnification axis with the beam expander 11a, and of magnifying the beam passed through the beam expander 11a, at a magnification of M2, along a second magnification axis with the beam expander 11b. Since the beam expanders 11a and 11b can be rotated about the optical axis OX individually, the direction where the cross-sectional shape of a beam is magnified can be changed individually. In other words, an angle between the first and second magnification axes on a plane perpendicular to the optical axis OX is changeable.

The magnification ratios M1 and M2 should be determined based on a purpose of the beam shape compensation system 100. That is, the magnification ratios M1 and M2 should be determined in accordance with a relationship between the cross-sectional shapes of a beam incident on and emerged from the beam shape compensation optical system 100.

FIG. 2A shows an example when the first and second magnification axes are parallel to each other, i.e., the angular difference θ between the first and second magnification is equal to 0 [degree]. In FIG. 2A, the major and minor axes of the cross section of the incident beam are parallel to the X and Y axes, respectively, and the first and second magnification axes are parallel to the Y axis.

If the incident beam has an elliptical cross section 30i whose major axis (axis in X direction in FIG. 2A) is a and minor axis (axis in Y direction in FIG. 2A) is b, the cross section of the beam passed through the beam expander 11a is an ellipse 30a whose major axis is a and the minor axis is M1×b. The beam is then incident on the second beam expander 11b, which magnifies the cross section in the direction of the minor axis b. Therefore, the cross section of the beam passed through the beam expander 11b is an ellipse 30b whose axis in X direction remains as a, and the axis in Y direction is M1×M2×b. Thus, if the first and second magnification axes are parallel to each other (i.e., the direction where the beam expander 11a has a power and the direction where the beam expander 11b has a power are parallel), the beam shape compensation optical system 100 functions to emit a beam whose cross section is magnified only in one direction, where the beam expanders 11a and 11b has a power, at a magnification ratio of M1×M2.

FIG. 2B shows an example when the angular difference θ of the directions where the beam expanders 11a and 11b have powers (i.e., the angle formed between the first and second magnification axes on a plane perpendicular to the optical axis OX) is equal to 90 [degrees]. In FIG. 2B, the major and minor axes of the cross section of the incident beam are parallel to the X and Y axes, respectively, and the first and second magnification axes are parallel to the Y and X axes, respectively.

If the incident beam has an elliptical cross section 30$i$ whose major axis (axis in X direction in FIG. 2B) is a and minor axis (axis in Y direction in FIG. 2B) is b, the cross section of the beam passed through the beam expander 11$a$ is an ellipse 30$a$ whose major axis is a and the minor axis is M1×b, similarly to the case shown in FIG. 2A. The beam is then incident on the second beam expander 11$b$, which magnifies the cross section of the beam in the X axis direction. Therefore, the cross section of the beam passed through the beam expander 11$b$ is an ellipse 30$b$ whose axis in X direction is M2×a, and the axis in Y direction is M1×b. This could be interpreted that the cross section of the incident beam is firstly magnified at the magnification ratio of M1/M2 along the second magnification axis, and then magnified at the ratio of M2 along the first and second magnification axes. Alternatively, it could also be interpreted that the cross section of the incident beam is firstly magnified at the magnification ratio of M2/M1 along the first magnification axis, and then magnified at the ratio of M1 along the first and second magnification axes.

If the angular difference $\theta$ (i.e., the angle between the first and second magnification axes on a plane perpendicular to the optical axis OX) is within a range between 0 and 90 [degrees] (i.e., $0°<\theta<90°$), the beam shape compensation optical system 100 can be considered as a system which magnifies a cross section of an incident beam at a ratio of M1 in a direction which is rotated by angle $\phi$ with respect to the first magnification axis, and then magnifies the beam at a ratio of MI along the first and second magnification axes. This will be describe in detail later.

It should be noted that there are two types of combinations: a combination of $\phi$, MA and MI where MA>1; and a combination where MA<1. In the following example, a case where MA<1 will be explained.

As described above, when $\theta=0°$, MA=M1×M2, and when $\theta=90°$, MA=M2/M1. When $0°<\theta<90°$, M1×M2<MA<M2/M1.

It should be noted that a ratio of the cross-sectional area of the beam emitted from the beam shape compensation optical system 100 to the incident beam is M1×M2. Therefore, if the area should be remained unchanged, the beam expanders 11$a$ and 11$b$ should be designed so as to satisfy a relationship: M1×M2=1.

For example, if a beam shape compensation optical system 100 is to be used for converting an incident beam, whose cross section has a major-to-minor axis ratio (a ratio of the major axis to the minor axis) within a range of 1 through 1.5625, into a beam having a circular cross section without changing the area of the cross section, the beam expander 11$a$ may be designed such that the magnification ratio M1 is equal to 0.8, and the beam expander 11$b$ may be designed such that the magnification ratio M2 is equal to 1.25. That is, M1×M2=1 and M2/M1=1.25$^2$=1.5625.

Figure 3:
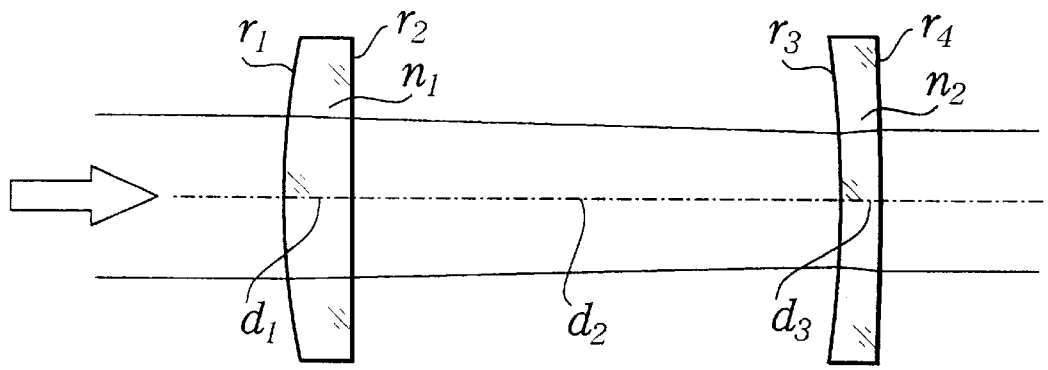
FIG. 3 shows an exemplary side view of an anamorphic beam expander which can be utilized in the beam shape compensation optical system according to the first embodiment.

A beam expander 11$a$, whose magnification ratio M1 is equal to 0.8, can be realized with configurations shown in FIG. 3.

A cylindrical lens on the light incident side has the following property:
  lens type: a plano-convex cylindrical lens;
  a radius of curvature on the light source side: 104.354;
  refraction index: 1.52177; and
  the thickness: 5.0.
A cylindrical lens on the light emitting side has the following property:
  lens type: a plano-concave cylindrical lens;
  a radius of curvature on the light source side: −83.483;
  refraction index: 1.52177; and
  the thickness: 3.0.
A distance between the two cylindrical lenses is d2.

Table I indicates numerical details of the beam exapnder shown in FIG. 3.

TABLE I

| | |
|---|---|
| $r_1$ | 104.354 |
| $r_2$ | ∞ |
| $r_3$ | −83.483 |
| $r_4$ | ∞ |
| $d_1$ | 5.000 |
| $d_2$ | 36.715 |
| $d_3$ | 3.000 |
| $n_1$ | 1.52177 |
| $n_2$ | 1.52177 | where r1–r4 are radii of curvature of the surfaces, d1–d3 represent distances between the surfaces, and n1 and n2 represent refraction indexes.

If the light is incident from the right-hand side in FIG. 3, the beam expander functions as an expander whose magnification ratio M2 is equal to 1.25.

Hereinafter, the beam shape compensation optical system according to the present invention will be described in detail. In the following description, it is assumed that M1=m (<1) and M2=1/m (therefore, M1×M2=1).

Figure 4:
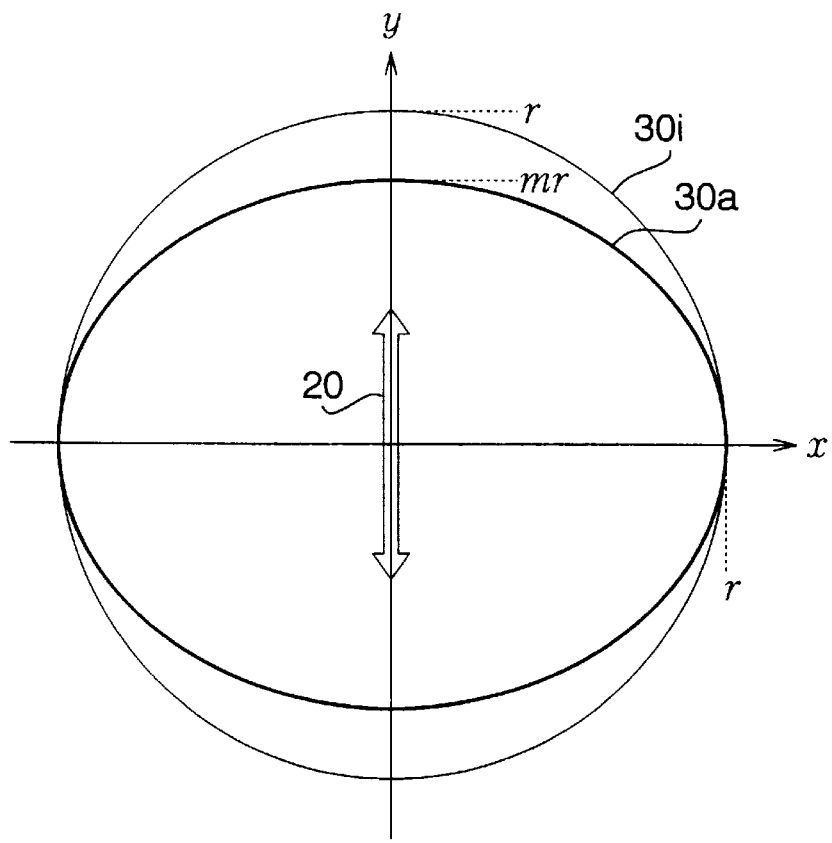
FIG. 4 illustrates a function of the beam shape compensation optical system according to the first embodiment.

Firstly, it is assumed that the cross section of a beam incident on the beam shape compensation optical system is a perfect circle 30$i$ (see FIG. 4) whose radius is r. In such a case, the cross sectional shape of the beam passed through the first shape compensator 10$a$ (i.e., the first beam expander 11$a$) is an ellipse 30$a$ whose minor axis is parallel with the first magnification direction, the length of the minor axis is 2mr, and the length of the major axis is 2r. Therefore, the shape of the cross section of the beam passed through the first shape compensator 10$a$ can be indicated, as shown in FIG. 4, with reference to an x–y coordinate system, the y axis being coincident with the first magnification direction. That is, the circular cross section 30$i$ of the beam incident on the beam shape compensation optical system 100 is converted into an elliptic cross section 30$a$. The minor axis of the ellipse 30$a$ is on the y axis and the length thereof is 2mr, while the major axis is on the x axis and the length thereof is 2r.

The shape of the cross section 30$a$ in FIG. 4 is expressed by formula (1) below.

$$\frac{x^2}{r^2} + \frac{y^2}{(mr)^2} = 1 \tag{1}$$

In the beam shape compensation optical system 100, the cross section 30$a$, which is expressed by the formula (1), of the beam is further magnified in the second magnification direction at a magnification ratio of M2 (=1/m>1) by the second shape compensator 10$b$ (i.e., the second beam expander 11$b$). If the rotation angle of the second magnification direction with respect to the first magnification direction on a plane perpendicular to the optical axis OX is represented by $\theta$, the cross sectional shape of the beam 30$b$ which is emerged from the second shape compensator 10$b$ is expressed by formula (2) with reference to the X–Y coordinate system (see FIG. 5) which is obtained by rotating the x–y coordinate system by $\theta$.

$$\frac{(X\cos\theta - mY\sin\theta)^2}{r^2} + \frac{(X\sin\theta + mY\cos\theta)^2}{(mr^2)} = 1 \qquad (2)$$

Figure 5:
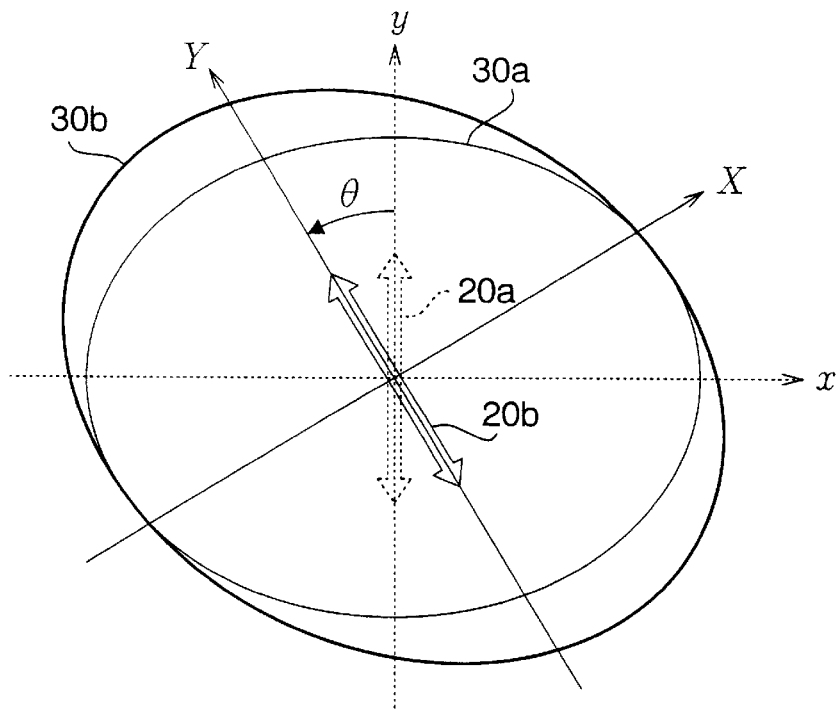
FIG. 5 illustrates a function of the beam shape compensation optical system according to the first embodiment.
Figure 6:
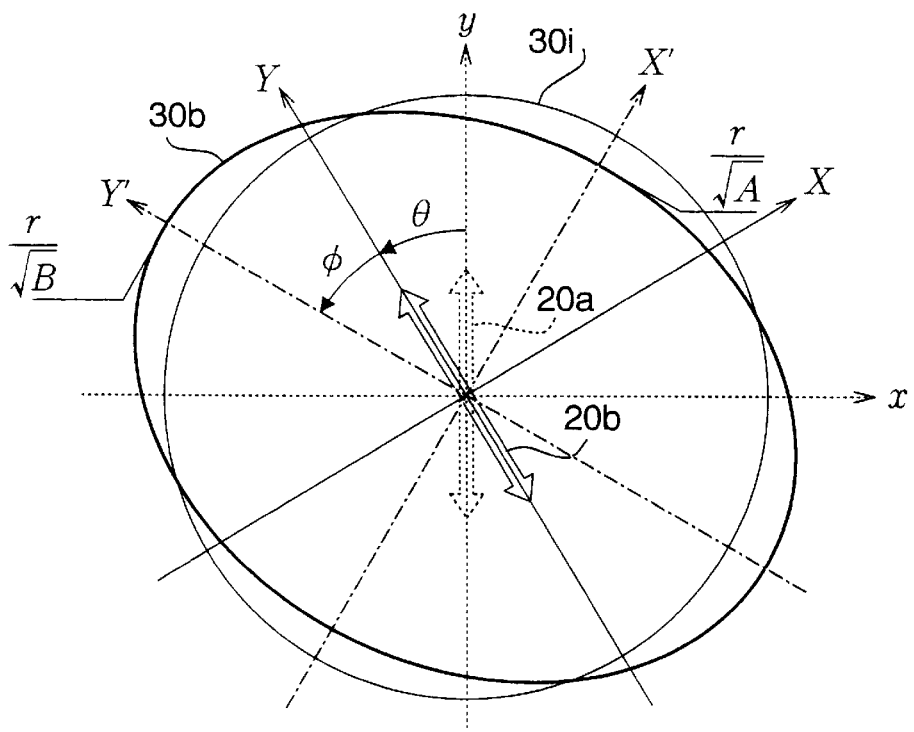
FIG. 6 illustrates a function of the beam shape compensation optical system according to the first embodiment.

That is, as shown in FIG. 5, the cross section of the beam 30*a* is magnified at the ratio of 1/m in the second magnification direction which is a direction forming the angle θ with respect to the y axis and is indicated by arrow 20*b* in FIG. 5. The resultant cross section is indicated as an ellipse 30*b* in FIG. 5. If the cross section of the beam 30*a* is expressed as a function of X and Y, the cross section of the beam 30*b* can be obtained only by substituting Y with Y/m in such a function.

A function expressing the cross section of the beam 30*a* with reference to the X–Y coordinate system can be obtained by applying a rotation of the coordinate system with respect to the formula (1).

In order to apply the above conversions with respect to formula (1), x is replaced with Xcosθ−mYsinθ, and y is replaced with Xsinθ+mYcosθ. Accordingly, the formula (2) can be obtained as a function expressing the cross section of the beam 30*b* with reference to the X–Y coordinate system.

By simplifying the formula (2) regarding X and Y, the formula (3) below is obtained.

$$aX^2 + hXy + \beta Y^2 = r^2 \qquad (3)$$

where, $$\alpha = \cos^2\theta + \frac{\sin^2\theta}{m^2}; \qquad (3\text{-}1)$$

$$h = 2 \cdot \left(\frac{1-m^2}{m}\right) \cdot \cos\theta\sin\theta; \text{ and} \qquad (3\text{-}2)$$

$$\beta = m^2\sin^2\theta + \cos^2\theta \qquad (3\text{---}3).$$

By deleting X and Y from the formula (3) using relationships: X=X'cosφ−Y'sinφ; and Y=X'sinφ+Y'cosφ, the following formula (4) can be obtained.

$$AX'^2 + BY'^2 + CX'Y' = r^2 \qquad (4)$$

where, $$A = \alpha\cos^2\phi + h\sin\phi\cos\phi + \beta\sin^2\phi \qquad (4\text{-}1);$$

$$B = \alpha\sin^2\phi - h\sin\phi\cos\phi + \beta\cos^2\phi \qquad (4\text{-}2); \text{ and}$$

$$C = 2(\beta - \alpha)\sin\phi\cos\phi + h(\cos^2\phi - \sin^2\phi) \qquad (4\text{-}3).$$

If a solution of φ which satisfies C=0 (i.e., the solution satisfying tan2φ=2m/((1+m²)tanθ) is substituted, the formula (3) can be converted into a form of $AX'^2 + BY'^2 = r^2$. The formula (i.e., formula (4) when C=0) expresses an ellipse whose major and minor axes are on the X' and Y' axes, respectively. The length of the minor axis is 2r/√A, and the length of the major axis is 2r/√B. It should be noted that, when m<1, A≧B regardless of the value of θ, and accordingly, a axis of an ellipse on the X' axis is usually the minor axis.

The conversion of X–Y coordinate system into X'–Y' coordinate system is a rotation of the coordinate system by the angle φ. That is, the angle φ satisfying C=0 represents a rotation angle of the major axis of the cross section of the beam 30*b* with respect to the Y axis. The rotation angle of the Y axis with respect to the y axis is θ, and therefore, it can be said that a beam shape compensation optical system 100, the first and second magnification directions of which form angle θ on a plane perpendicular to the optical axis OX, magnifies a cross section of the incident beam at a magnification ratio of 1/√B in the Y' axis direction which is rotated by θ+φ with respect to the y axis (i.e., along the first magnification axis), and at a magnification ratio of 1/√A in the X' axis direction which is perpendicular to the Y' axis. This can be interpreted that the beam shape compensation optical system 100 magnifies the incident beam at a magnification ratio of √(A/B) in the direction rotated by φ with respect to the second magnification axis, and then at a ratio of 1/√A in both the first and second magnification axes directions.

Thus, a beam shape compensation optical system having two magnification axes forming angle of φ is capable of converting a beam whose cross section is an ellipse, a minor axis of which is 2r/√B in length in the Y' axis direction and a major axis of which is 2r/√A in length in the X' axis direction, into a beam having a perfect circular cross section.

In order to convert a cross section of a certain beam having an ellipse cross section into a beam having a circular cross section, the following steps are performed.

Firstly, information regarding the shape of the cross section of the beam to be compensated (e.g., a ratio Rx of a length of the minor axis to a length of the major axis, inclination of the major/minor axis with respect a reference plane) is obtained. Then, using formulae (3-1) through (3—3) and (4-1) through (4-3), under a condition that C=0, an angle θ at which Rx equals √(A/B) is obtained. Based on the angle θ, the angle φ is obtained. Then, the magnification axes of the shape compensator 10*a* and 10*b* are adjusted in accordance with thus obtained information.

Hereinafter, application of the beam shape compensation optical system according to the first embodiment will be described.

FIG. 7 schematically shows a configuration of an imaging device employing the beam shape compensation optical system 100 according to the first embodiment.

The imaging device is used for forming a circuit pattern on a base plate. The imaging device includes: a laser source 40, a half mirror 41 for splitting the laser beam emitted by the laser source 40, a pair of optical systems 45*a* and 45*b*.

Each of the optical systems 45*a* and 45*b* is provided with an AOM 42 for compensating tilt errors, a beam separator 43 for dividing an incident beam into eight beams, a multi-channel AOM 44 for modulating each of the eight beams individually.

The imaging device further includes a polarized beam combining prism 46 for combining the 16 beams emitted from the optical systems 45*a* and 45*b*, a polygon mirror 47 which deflects the combined 16 beams to scan within a predetermined angular range, an fθ lens 48 and a condenser lens 49 for converging the deflected beams on a surface to be scanned (i.e., the base plate of a printed circuit board).

The beam shape compensation optical system is arranged between the laser source 40 and the half mirror 41.

When the imaging device is manufactured, a shape of the laser beam emitted by the laser source 40 is measured, and the axis length ratio Rx, and an inclination angle of the major axis with respect to a reference plane are obtained. Based on the measured values, the orientation of each of the beam expander 11*a* and 11*b* are adjusted.

As described before, when the axis length ratio Rx is known, the angles θ and φ can be calculated in accordance with the formulae (3-1) through (3—3) and (4-1) through (4-3). Accordingly, the orientation of the magnification axis of each of the beam expanders 11a and 11b can be adjusted based on the calculated angles.

Alternatively, with use of a graph, which will be described hereinafter, the orientation of the magnification axes of the beam expanders 11a and 11b can be adjusted.

In order to adjust the orientation of the magnification axes of the beam expanders 11a and 11b using graphs, a graph showing a θ-dependence of compensation ratios (i.e., a ratio of a major axis to a minor axis), and a graph showing a θ-dependence of an angle φ. The angle φ is used for adjusting the orientation of the beam expanders 11a and 11b with respect to a major axis of the cross section of the incident beam. The angle φ can be expressed by the following equation.

$$\phi = 90 - \theta - \phi [\text{degrees}]$$

FIGS. 8 and 9 show graphs indicating the θ dependence of the compensation ratio, and the θ dependence of the angle φ when M1=0.8 and M2=1.25. In FIG. 8, the compensation ratio represents the major-to-minor axis ratio. For example, if the axis ratio is 1.2, in order to change the cross-sectional shape of the beam, the rotation angle should be approximately 25 degrees. In order to obtain angles θ and φ, firstly, the rotation angle θ which gives the compensation ratio corresponding to the axis ratio of the cross section of the incident beam from FIG. 8. Then, from FIG. 9, the rotation angle φ corresponding to the rotation angle θ obtained from FIG. 8 is obtained.

Then, as shown in FIG. 10, the first expander 11a is rotated such that the first magnification axis (indicated by arrow 20a) is rotated by p with respect to the major axis of the cross section of the incident beam 30i, and the second expander 11b is rotated such that the second magnification axis (indicated by arrow 20b) is rotated by θ with respect to the first magnification axis. With this adjustment, the cross section of the beam passed through the beam shape compensation optical system has a circular shape.

As described above, according to the first embodiment of the beam shape compensation optical system, a cross section of the beam can be changed in the two magnification axes and in accordance with the angle therebetween, the cross section of the beam can be corrected easily. If such a beam shaping optical system is employed in an imaging device, adjustment of the beam shape can be executed relative easily, particularly when the device is manufactured and/or the laser sources are exchanged.

FIG. 11 shows a beam shape compensation optical system according to a second embodiment of the invention. In the second embodiment, instead of the beam expanders having lenses, beam expanders provided with prisms are used.

FIG. 11 shows an beam expander having a magnification ratio of 0.8. Specifically, the beam expander is provided with a first prism and a second prism. The first prism has a first surface which is inclined with respect to a rotational axis AX of the beam expander by 20° and a second surface which is inclined with respect to the rotational axis AX by 33.9°. A distance, on the rotational axis AX, between the first and second surfaces is 12.0 mm. The second prism has a first surface which is inclined with respect to a rotational axis AX of the beam expander by −9.0° and a second surface which is inclined with respect to the rotational axis AX by −26.257°. A distance, on the rotational axis AX, between the first and second surfaces is 2.4 mm. The distance, on the rotational axis AX, between the second surface of the first prism and the first surface of the second prism is 5.0 mm.

Numerical details are indicated in Table II. When a beam is incident from the left-hand side in FIG. 11, the beam expander functions to magnify at a magnification ratio of 0.8. If a beam is incident from the right-hand side in FIG. 11, the beam expander functions to magnify at a magnification ratio of 1.25.

TABLE II

| | |
|---|---|
| $\theta_1$ | 20.000 |
| $\theta_2$ | 33.900 |
| $\theta_3$ | −9.000 |
| $\theta_4$ | −26.257 |
| $d_1$ | 12.000 |
| $d_2$ | 5.000 |
| $d_3$ | 2.000 |
| $n_1$ | 1.49217 |
| $n_2$ | 1.49217 | where $\theta_1$–$\theta_4$ are angles between the surfaces of the prisms with respect to the rotational axis AX, $d_1$–$d_3$ represent distances between the surfaces on the axis AX, and $n_1$ and $n_2$ represent refraction indexes.

With the beam expander shown in FIG. 11, the beam shape compensation optical system similar to that according to the first embodiment can be constituted.

As described above, according to the present invention, a beam shape compensation optical system including two anamorphic beam expanders, and only by rotating each beam expander, various shape of the cross section of the beam can easily be compensated. Further, according to the imaging device employing such a beam shape compensation optical system, adjustment operation when the device is manufactured and/or the laser sources are exchanged can be done easily.

In the above described embodiments, the beam shape compensation optical system is constituted such that the first and second beam compensators are arranged coaxially. However, the invention is not limited to the coaxial arrangement, but the rotation axes of the first and second beam shape compensator may be shifted with each other. In such a case, although the principal ray of the incident beam and the principal ray of the beam emitted from the beam shape compensation optical system would be shifted, the shape of the cross section of the beam can be compensated similarly to the case where the beam compensators are arranged coaxially.

In the above embodiments, the same type of beam expanders are used in a beam shape compensation optical system. However, it may be possible to use different types of beam expanders in one beam shape compensation optical system. That is, a beam expander utilizing cylindrical lenses and a beam expander utilizing prisms can be combined to constitute a beam shape compensation optical system.

In the first embodiment, each lens is a cylindrical lens. However, the invention is not limited to such a construction, and the lenses may have powers in two direction as far as the beam expander is anamorphic, and emits a parallel beam.

In the embodiments, the magnifications M1 and M2 are different. However, it may be the same magnification. In such a case, although the area of the cross section of the incident beam and the area of the cross section of the emitted beam may be different from each other, only one type of beam expander should be manufactured, which reduces the manufacturing cost.

The present disclosure relates to the subject matters contained in Japanese Patent Application No. HEI 11-001579, filed on Jan. 7, 1999, which is expressly incorporated herein by reference in its entirety.

What is claimed is:

1. A beam shape compensation optical system, comprising:
   a first anamorphic beam expander which expands a cross section of a parallel beam incident along a predetermined direction at a first magnification ratio M1 at least in a first direction which is perpendicular to the predetermined direction; and
   a second anamorphic beam expander which expands a cross section of a parallel beam incident along the predetermined direction at a second magnification ratio M2 at least in a second direction which is perpendicular to the predetermined direction,
   said first and second anamorphic beam expander being rotatable so that an angle between said first direction and said second direction on a plane perpendicular to the predetermined direction is changeable.

2. A beam shape compensation optical system, comprising:
   a first beam expander which expands a cross section of a parallel beam incident along a first predetermined direction at a first magnification ratio M1 along a first magnification axis which is perpendicular to the predetermined direction;
   a first holder for holding said first beam expander such that said first beam expander is rotatable about a first axis which is parallel to said first predetermined direction;
   a second beam expander which expands a cross section of a parallel beam incident along a second predetermined direction at a second magnification ratio M2 along a second magnification axis which is perpendicular to the predetermined direction; and
   a second holder for holding said second beam expander such that said second beam expander is rotatable about a second axis which is parallel to said second predetermined direction.

3. The beam shape compensation optical system according to claim 2, wherein said second axis is coaxial with said first axis.

4. The beam shape compensation optical system according to claim 2, wherein M1×M2=1.

5. The beam shape compensation optical system according to claim 2, wherein M1 is equal to M2.

6. The beam shape compensation optical system according to claim 2, wherein each of said first and second beam expander includes two cylindrical lenses.

7. The beam shape compensation optical system according to claim 2, wherein each of said first and second beam expander includes two prisms.

8. An imaging device, comprising:
   a laser source for emitting a parallel laser beam;
   a beam shape compensation optical system inserted within an optical path of said laser beam for compensating a cross sectional shape of said laser beam,
   said beam shape compensation optical system including:
      a first beam expander which expands a cross section of said laser beam incident along a first predetermined direction at a first magnification ratio M1 along a first magnification axis which is perpendicular to said first predetermined direction;
      a first holder for holding said first beam expander such that said first beam expander is rotatable about a first axis which is parallel to said first predetermined direction;
      a second beam expander which expands a cross section of said laser beam incident along a second predetermined direction at a second magnification ratio M2 along a second magnification axis which is perpendicular to said second predetermined direction; and
      a second holder for holding said second beam expander such that said second beam expander is rotatable about a second axis which is parallel to said second predetermined direction.

9. The imaging device according to claim 8, wherein said second axis is coaxial with said first axis.

10. The beam shape compensation optical system according to claim 8, wherein M1×M2=1.

11. The imaging device according to claim 8, wherein M1 is equal to M2.

12. The imaging device according to claim 8, wherein each of said first and second beam expander includes two cylindrical lenses.

13. The imaging device according to claim 8, wherein each of said first and second beam expander includes two prisms.

* * * * *